(12) United States Patent
Yang et al.

(10) Patent No.: US 7,892,676 B2
(45) Date of Patent: Feb. 22, 2011

(54) CATHODE MATERIAL FOR MANUFACTURING A RECHARGEABLE BATTERY

(75) Inventors: Chih-Wei Yang, Taipei (TW); Wen-Ren Liu, Taipei (TW)

(73) Assignee: Advanced Lithium Electrochemistry Co., Ltd., Taoyuan, Taoyuan County (TW)

( * ) Notice: Subject to any disclaimer, the term of this patent is extended or adjusted under 35 U.S.C. 154(b) by 1108 days.

(21) Appl. No.: 11/518,805

(22) Filed: Sep. 11, 2006

(65) Prior Publication Data

US 2007/0264567 A1 Nov. 15, 2007

(30) Foreign Application Priority Data

May 11, 2006 (CN) .................. 2006 1 0080365

(51) Int. Cl.
*H01M 4/58* (2010.01)
(52) U.S. Cl. ............... 429/218.1; 429/220; 429/221; 429/223; 429/224; 429/229; 429/231; 429/231.5; 429/231.6; 429/231.9; 429/231.95

(58) Field of Classification Search ............. 429/218.1, 429/220, 221, 223, 224, 229, 231.5, 231.6, 429/231.9, 231.95, 231
See application file for complete search history.

(56) References Cited

U.S. PATENT DOCUMENTS

| 7,524,529 | B2* | 4/2009 | Yang ...................... 427/213 |
| 2005/0019670 | A1* | 1/2005 | Amine et al. ............. 429/326 |
| 2006/0093919 | A1* | 5/2006 | Wixom et al. ........ 429/231.95 |
| 2006/0147809 | A1* | 7/2006 | Amine et al. ............. 429/326 |
| 2008/0113261 | A1* | 5/2008 | De Jonghe et al. ........ 429/137 |
| 2008/0241690 | A1* | 10/2008 | Delacourt et al. .......... 429/221 |

* cited by examiner

*Primary Examiner*—Wayne Langel
(74) *Attorney, Agent, or Firm*—Brinks Hofer Gilson & Lione (57) ABSTRACT

A cathode material composition includes a composite compound having a formula of $A_{3x}M1_{2y}(PO_4)_3$, and a conductive metal oxide having a formula of $M2_aO_b$, wherein A represents a metal element selected from Groups IA, IIA and IIIA; each of M1 and M2 independently represents a metal element selected from Groups IIA and IIIA, and transition elements; and $0 \leq x \leq 1.2$, $1.2 \leq y \leq 1.8$, $0 < a \leq 7$, and $0 < b \leq 12$. A rechargeable battery including a cathode made from the above cathode material composition is also disclosed.

15 Claims, 5 Drawing Sheets

CATHODE MATERIAL FOR MANUFACTURING A RECHARGEABLE BATTERY

CROSS-REFERENCE TO RELATED APPLICATION

This application claims priority of Chinese Application No. 200610080365.5, filed on May 11, 2006.

BACKGROUND OF THE INVENTION

1. Field of the Invention

This invention relates to a cathode material composition for cathode material for manufacturing a rechargeable battery, more particularly to a cathode material composition for manufacturing a rechargeable battery including a composite compound and a conductive metal oxide. This invention also relates to a rechargeable battery including a cathode made from the cathode material prepared from the cathode material composition.

2. Description of the Related Art

Along with diversified development of electronic products, there is increasing need for portable power supplies. For example, electronic consumer products, medical devices, motorcycles, automobiles, and power tools and the like require a portable power supply for power source. For current portable power supplies, rechargeable batteries are relatively popular. Since lithium rechargeable batteries have a high ratio of volume to capacity, pollution-free and recyclable charge/discharge properties, and no memory effect, it has a great development potential in the future.

Additionally, a cathode material used for manufacturing the cathode plays an important role in the performance of the rechargeable battery. Since lithium ferrous phosphate-based compound, which has an olivine or NASICON structure, is environmentally benign, relatively stable and resourceful, and has a relatively high specific capacity, and relatively good charge/discharge cycling performance and thermostability, it has been evaluated to be a good candidate as the cathode material with greatest development potential.

However, since conductivity and lithium ion diffusion rate of lithium ferrous phosphate are relatively low, the specific capacity will decrease at a high charge/discharge rate so that use of such lithium ferrous phosphate in high current density applications is restricted.

In order to improve the conductivity of such lithium ferrous phosphate, it has been proposed to reduce particle size of lithium ferrous phosphate or add conductive material to lithium ferrous phosphate. For example, Japanese Patent Publication No. 2003-323892 (hereinafter referred to as the '892 publication) discloses a method for making a cathode material, which involves mixing lithium ferrous phosphate powders, conductive metal particles and a polar solvent in a hermetic container at a temperature ranging from 100 to 250° C. Since the method of the '892 publication is required to be conducted at a relatively high temperature and pressure, and since the activity of the conductive metal particles is relatively high, it is difficult to control operating conditions in the method of the '892 publication and hence, production cost of the method is relatively expensive.

Another approach to mix conductive material with the lithium ferrous phosphate involves addition of organic material to a reactant mixture containing lithium ferrous phosphate. For example, in a solid-phase mixing process, lithium salt, iron salt, phosphate and the organic material are mixed, and then heated. The lithium salt, iron salt, and phosphate are formed into lithium ferrous phosphate powders, while the organic material is pyrolyzed to produce alkane and alkene gases, and conductive carbonaceous materials that are scattered in the lithium ferrous phosphate powders. However, the pyrolyzed products, i.e., alkane and alkene gases, cause environmental pollution and raise environmental concerns. Accordingly, this method is not recommended.

Therefore, there is still a need in the art to provide a cathode material that can satisfy electrochemical properties and that can be produced by an economical and environmental friendly method.

SUMMARY OF THE INVENTION

Therefore, the objective of the present invention is to provide a cathode material that can avoid the aforesaid problems encountered in the prior art.

According to one aspect of this invention, a cathode material composition includes a composite compound having a formula of $A_{3x}M1_{2y}(PO_4)_3$, and a conductive metal oxide having a formula of $M2_aO_b$, wherein A represents a metal element selected from the group consisting of Groups IA, IIA and IIIA; each of M1 and M2 independently represents a metal element selected from the group consisting of Groups IIA and IIIA, and transition elements; and $0 \leq x \leq 1.2$, $1.2 \leq y \leq 1.8$, $0 < a \leq 7$, and $0 < b \leq 12$.

According to another aspect of this invention, a rechargeable battery includes an anode, an electrolyte, and a cathode. The cathode is made from a cathode material, that includes an aggregation of particles of a composite compound having a formula of $A_{3x}M1_{2y}(PO_4)_3$, and fine particles of a conductive metal oxide dispersed in the aggregation. The metal oxide has a formula of $M2_aO_b$, wherein A represents a metal element selected from the group consisting of Groups IA, IIA and IIIA; each of M1 and M2 independently represents a metal element selected from the group consisting of Groups IIA and IIIA, and transition elements; and $0 \leq x \leq 1.2$, $1.2 \leq y \leq 1.8$, $0 < a \leq 7$, and $0 < b \leq 12$.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

According to this invention, a cathode material composition includes a composite compound having a formula of $A_{3x}M1_{2y}(PO_4)_3$, and a conductive metal oxide having a formula of $M2_aO_b$, wherein A represents a metal element selected from the group consisting of Groups IA, IIA and IIIA; each of M1 and M2 independently represents a metal element selected from the group consisting of Groups IIA and IIIA, and transition elements; and $0 \leq x \leq 1.2$, $1.2 \leq y \leq 1.8$, $0 < a \leq 7$, and $0 < b \leq 12$.

Preferably, in the formula $A_{3x}M1_{2y}(PO_4)_3$ of the composite compound and the formula $M2_aO_b$ of the conductive metal oxide, A is selected from the group consisting of Li, Na, K, Be, Mg, B, and Al, and each of M1 and M2 is independently selected from the group consisting of Sc, Ti, V, Cr, Mn, Fe, Co, Ni, Cu, Zn, Y, Zr, Nb, Mo, Be, Mg, Ca, Sr, B, Al, Ga, In, Si, Ge, and Sn. More preferably, the composite compound has an olivine or NASICON structure. One of non-limiting examples of the composite compound is lithium ferrous phosphate ($LiFePO_4$).

Additionally, the conductive metal oxide is preferably selected from the group consisting of $ZnAlO_z$, CuO, and ZnO. The subscript z represents the number of oxygen atoms for balancing with valences of zinc and aluminum atoms.

Amount of the conductive metal oxide included in the cathode material composition can be adjusted according to the desired properties or application of the cathode material composition. Preferably, the conductive metal oxide is present in an amount ranging from 0.1 to 5% by weight based on total weight of the cathode material composition.

Preferably, the cathode material composition further includes a carbonaceous material. The carbonaceous material can be conductive or non-conductive. More preferably, the carbonaceous material is present in an amount ranging from 0.1 to 5% by weight based on total weight of the cathode material composition.

The cathode material composition of this invention can be used for preparing a cathode material by the following steps: preparing a solution including A ion, M1 ion, and $PO_4^{3-}$; adding M2 salt into the solution; adjusting the pH of the solution so as to form M2 hydroxide and to convert M2 hydroxide into M2 oxide; and heating the solution containing M2 oxide so as to form the cathode material with fine particles of M2 oxide dispersed in an aggregation of particles of $A_{3x}M1_{2y}(PO_4)_3$.

Alternatively, the cathode material can be prepared from the cathode material composition by the steps: preparing powdered composite compound of $A_{3x}M1_{2y}(PO_4)_3$; adding the powdered composite compound to a M2 salt solution; adjusting the pH value of the reactant solution so as to produce M2 hydroxide, adjusting the pH of the solution based on the relationship between solubility of M2 hydroxide and the pH value so as to minimize the solubility of M2 hydroxide and so as to disperse uniformly M2 hydroxide particles in the powdered composite compound and on the surfaces of the powdered composite compound; and filtering and drying the mixture thus obtained so as to form solid powders. The solid powders are subsequently heated at a temperature ranging from 50 to 900° C. according to the properties of M2 oxide thus formed so as to obtain the cathode material with fine particles of M2 oxide dispersed in an aggregation of particles of $A_{3x}M1_{2y}(PO_4)_3$.

Preferably, adjustment of the pH value of the solution in the above methods is conducted through addition of ammonia solution.

EXAMPLES

Example A 4050 g of phosphoric acid and 625 g of citric acid were mixed and dissolved in 15 liters of deionized water to form an acidic solution. 1080 g of iron powders were added into and dissociated in the acidic solution so as to form ferric phosphate and ferrous phosphate in the acidic solution. After the iron powders were dissociated completely, 485 g of zinc chloride was added into and dispersed in the acidic solution with agitation by a mixer. 1500 g of lithium hydroxide was dissolved in 15 liters of water so as to form a basic solution. The basic solution was then added into the acidic solution. The pH value of the combined solution was adjusted to 8.5 through addition of ammonia water. By this time, zinc chloride was dissociated to form zinc hydroxide ($Zn(OH)_2$) 2 due to neutralization. In addition, since neutralization is an exothermic reaction, zinc hydroxide thus formed was subsequently converted to zinc oxide (ZnO) by the heat generated from the neutralization.

Next, the combined solution was spray-dried so as to form fine powders. The fine powders were placed in an alumina crucible which was placed in a furnace chamber where carbon powders were placed. Temperature of the furnace chamber was raised to 800° C. by a rate of 5° C./min, and the fine powders were maintained at 800° C., under a nitrogen environment for 8 hours. The product thus obtained was in powdered form ($LiFePO_4$/ZnO/C) having an aggregation of particles of lithium ferrous phosphate in which zinc oxide and carbonaceous materials are dispersed.

Next, the cathode material was evenly mixed with carbon black and polyvinylidene fluoride in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Macoor Series 4000 Automated Test System (Maccor Inc., Tulsa, Okla., U.S.A.).

Comparative Example A 4.196 g of lithium hydroxide, 17.99 g of ferrous oxalate and 11.53 g of phosphate were added into 200 ml of deionized water to form a solution. The solution was dried after being mixed thoroughly so as to form fine powders. The fine powders were placed in an alumina crucible and the crucible was placed in a furnace chamber. Temperature of the furnace chamber was raised to 800° C. by a rate of 5° C./min, and the fine powders were maintained at 800° C. under a nitrogen environment for 8 hours. The temperature of the furnace chamber was then cooled to the room temperature. Powdered lithium ferrous phosphate was obtained.

Next, the powdered lithium ferrous phosphate thus formed was evenly mixed with carbon black and polyvinylidene fluoride in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Maccor Series 4000 Automated Test System (Maccor Inc., Tulsa, Okla., U.S.A.).

Example B 2880 g of phosphoric acid and 313 g of citric acid were mixed and dissolved in 10 liters of deionized water to form an acidic solution. 1396 g of iron powders were added into and dissociated in the acidic solution so as to form ferric phosphate and ferrous phosphate. Addition of citric acid can accelerate dissociation of the iron powders and formation of ferric phosphate and ferrous phosphate. 1049 g of lithium hydroxide was dissolved in 10 liters of water so as to form a non-acidic solution. The non-acidic solution was then added into the acidic solution. The combined solution was subsequently spray-dried to form fine powders.

The fine powders were placed in an alumina crucible and the crucible was placed in a furnace chamber. Temperature of the furnace chamber was raised to 700° C. by a rate of 5° C./min, and the fine powders were maintained at 700° C. under a nitrogen environment for 8 hours. Powdered lithium ferrous phosphate was formed.

1.4 g of zinc chloride and 1.2 g of aluminum chloride were dissolved in 150 ml of deionized water, and the solution thus obtained was added with lithium ferrous phosphate powders to form a slurry. 1.5 ml of ammonia solution was added into the slurry, and the pH value of the slurry was changed from about 4.5 to about 8.5. The slurry was then filtered. The filtered cake was placed in an alumina crucible and the crucible was placed in a furnace chamber. Temperature of the furnace chamber was raised to 800° C. under a rate of 5° C./min, and the filtered cake was maintained at 800° C., at a nitrogen environment for 8 hours. The product obtained is in powdered form ($LiFePO_4/ZnAlO_x/C$) having an aggregation of particles of lithium ferrous phosphate in which zinc aluminum oxide and carbonaceous materials are dispersed.

In this example, the carbonaceous material dispersed in the aggregation of particles of lithium ferrous phosphate is obtained from citric acid, and has a non-conductive $sp^3$ structure. Hence, the effect of zinc aluminum oxide on electrochemical properties of lithium ferrous phosphate can be measured without interference from the carbonaceous material.

Next, the cathode material was evenly mixed with carbon black and polyvinylidene fluoride in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Macoor Series 4000 Automated Test System (Maccor Inc., Tulsa, Okla., U.S.A.).

Comparative Example B 50 g of the reactant powders were placed in an alumina crucible and the crucible was placed in a furnace chamber. Temperature of the furnace chamber was raised to 800° C. by a rate of 5° C./min, and the fine powders were maintained at 800° C. under a nitrogen environment for 8 hours. The temperature of the furnace chamber was then cooled to room temperature. Powdered lithium ferrous phosphate was obtained.

Next, the lithium ferrous phosphate powders were evenly mixed with carbon black and polyvinylidene fluoride in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Macoor Series 4000 Automated Test System (Maccor Inc., Tulsa, Okla., U.S.A.).

Example C 11.5 g of phosphoric acid, 1 g of citric acid, and 1 g of sucrose were dissolved in 100 ml of deionized water to form an acidic solution. 5.6 g of iron powders were added into and dissociated in the acidic solution so as to form ferric phosphate and ferrous phosphate. After the iron powders were completely dissociated, 0.72 g of copper nitrate was added into and mixed with the acidic solution. 4.2 g of lithium hydroxide was dissolved in 100 ml of water so as to form a non-acidic solution which was then added into the acidic solution to conduct neutralization. By this time, the pH value of the combined solution was slightly lower than 7. Then, the pH value of the combined solution was adjusted to about 8 through addition of ammonia water. The combined solution was dried after mixing so as to form fine powders. The fine powders were placed in an alumina crucible and the crucible was placed in a furnace chamber where carbon powders were placed. Temperature of the furnace chamber was raised to 800° C. by a rate of 5° C./min, and the fine powders were maintained at 800° C. under a nitrogen environment for 8 hours. The furnace chamber was subsequently cooled to room temperature. The product thus obtained was in powdered form ($LiFePO_4/CuO/C$) having an aggregation of particles of lithium ferrous phosphate in which copper oxide and carbonaceous materials are dispersed.

Next, the cathode material was evenly mixed with carbon black and polyvinylidene fluoride in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Macoor Series 4000 Automated Test System (Maccor Inc., Tulsa, Okla., U.S.A.).

Results of Evaluation Tests

Electrochemical Reversibility

Figure 1:
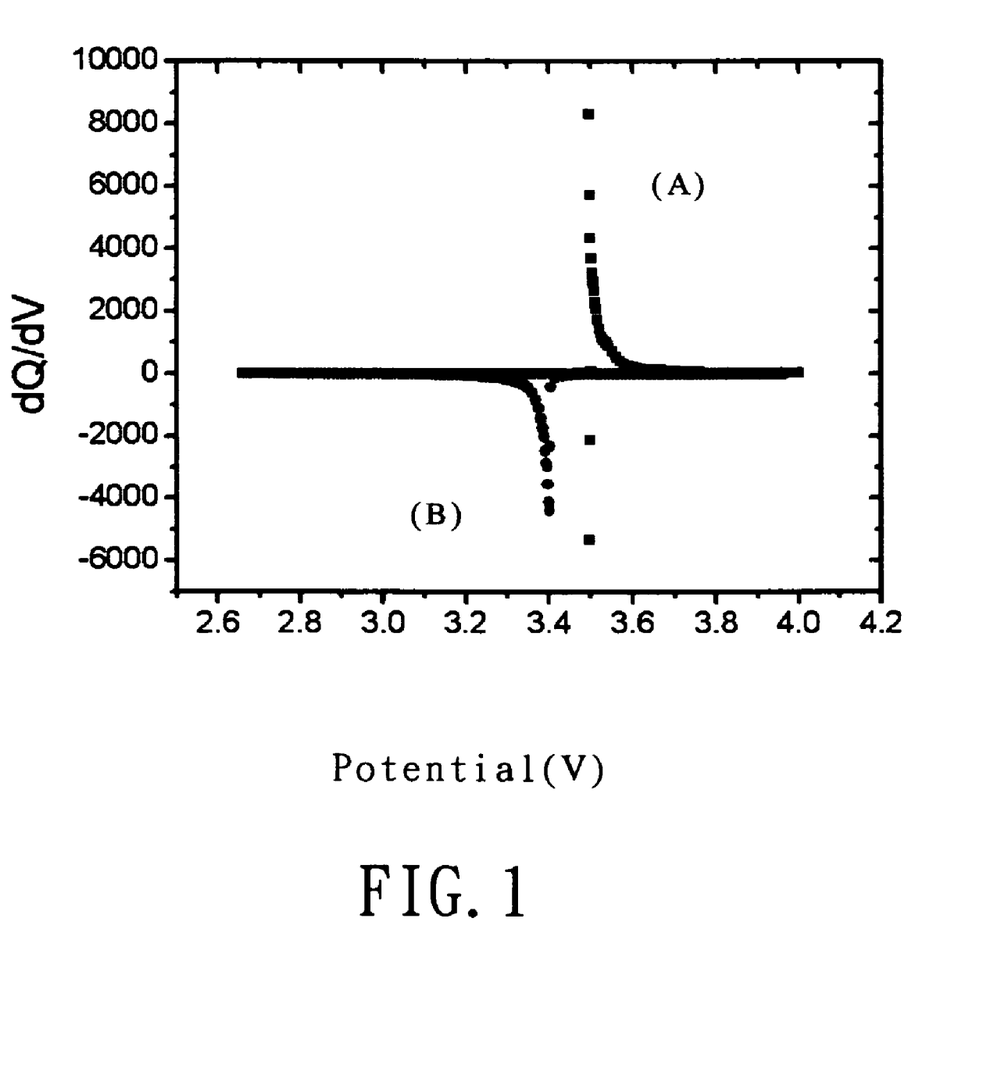
FIG. 1 shows an differential capacity (dQ/dV) versus voltage (V) plot for a rechargeable battery with a cathode made from a cathode material obtained from Example A of this invention.
Figure 2:
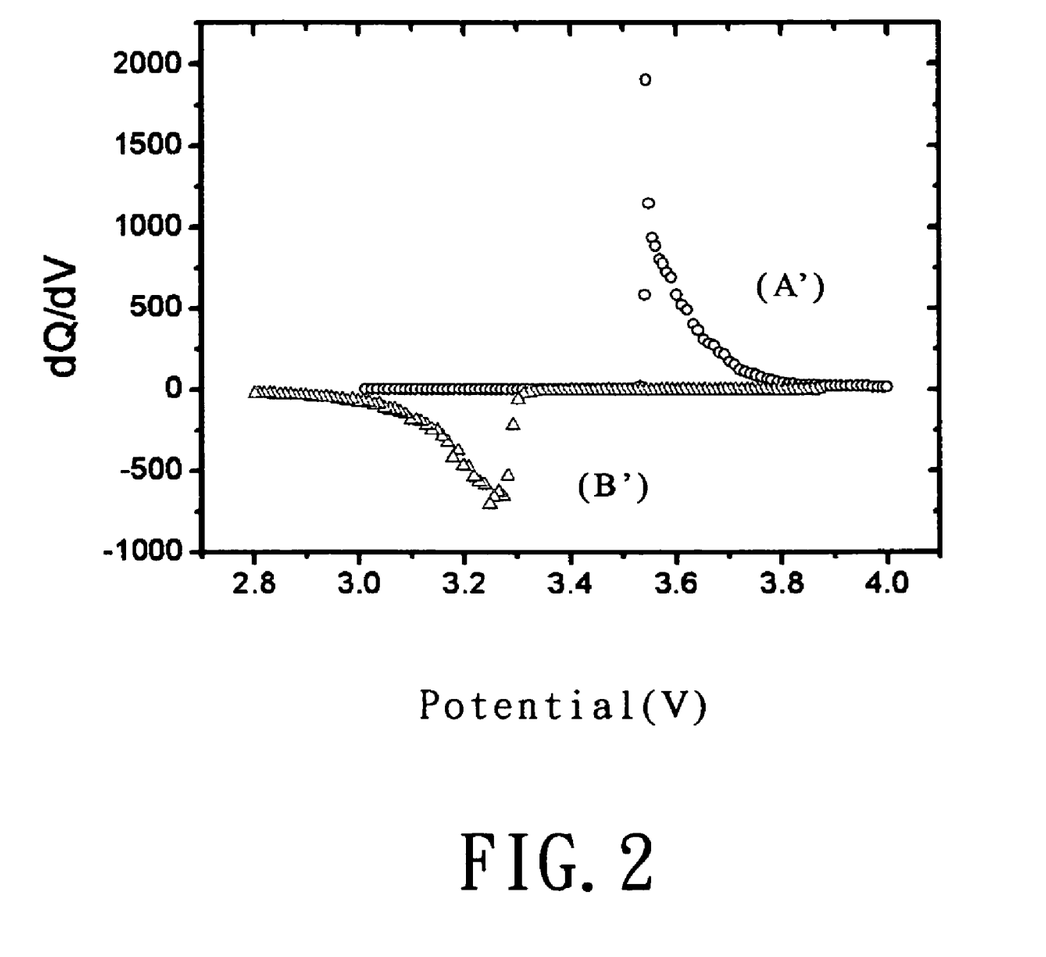
FIG. 2 shows an differential capacity (dQ/dV) versus voltage (V) plot for a rechargeable battery with a cathode made from a cathode material obtained from comparative Example A.

FIGS. 1 and 2 show differential capacity (dQ/dV) versus voltage (V) plots for cathodes made from the cathode material ($LiFePO_4/ZnO/C$) in the rechargeable battery of Example A of this invention and the lithium ferrous phosphate powders in the rechargeable battery of comparative Example A, respectively. The applied charge/discharge voltage ranges from 2.8 V to 4.0, V and the charge/discharge rate is set to C/5.

From the results shown in FIGS. 1 (Example A) and 2 (Comparative Example A), the charge peak (curve A) and the discharge peak (curve B) of the cathode of the rechargeable battery of Example A are very close to each other and occur at 3.50 V and 3.40 V, respectively, which is an indication of an excellent electrochemical reversibility. On the other hanc, the charge peak (curve A') and the discharge peak (curve B') of the cathode of the rechargeable battery of Comparative Example A are far from each other and occur at 3.55V and 3.25V, respectively, which is an indication of a poor electrochemical reversibility.

Capacity

Figure 3:
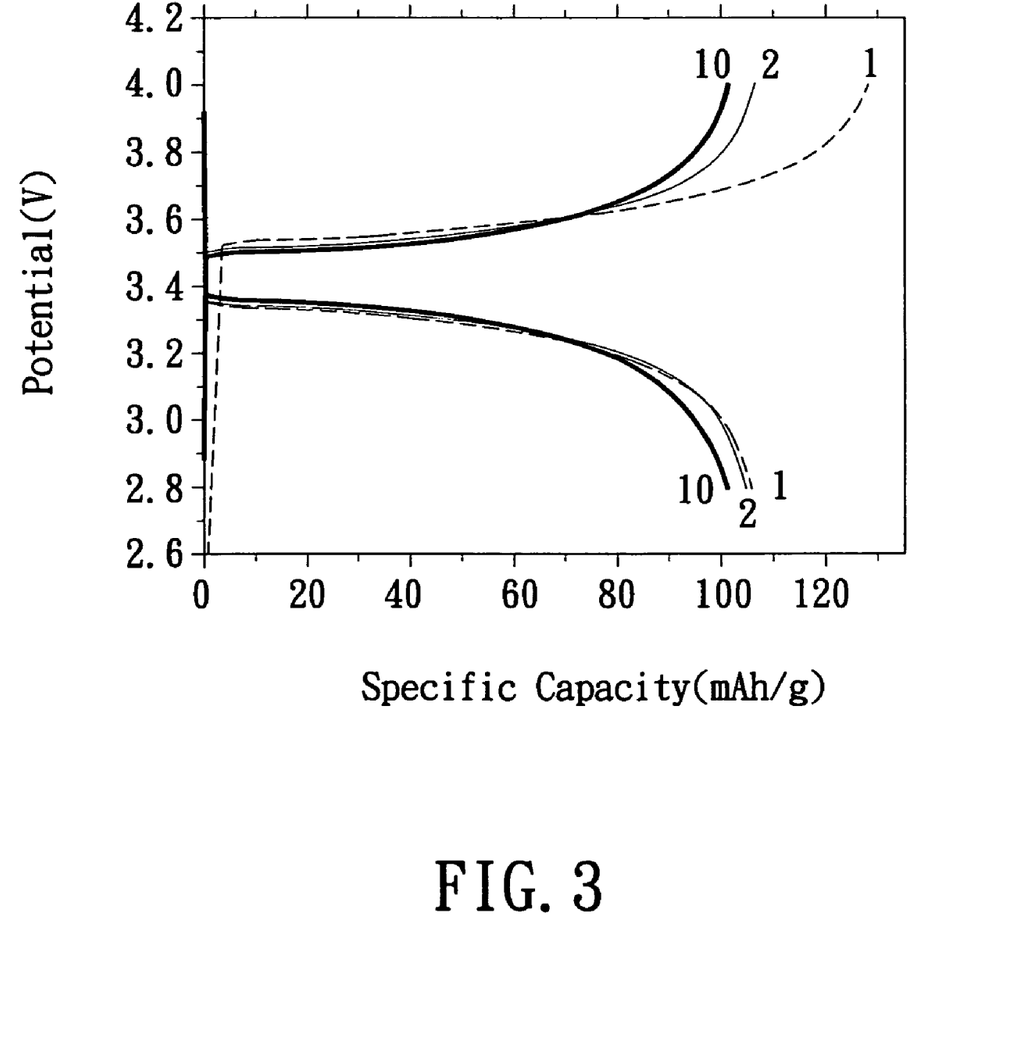
FIG. 3 shows a specific capacity versus voltage plot for a rechargeable battery with a cathode made from a cathode material obtained from Example B of this invention.
Figure 4:
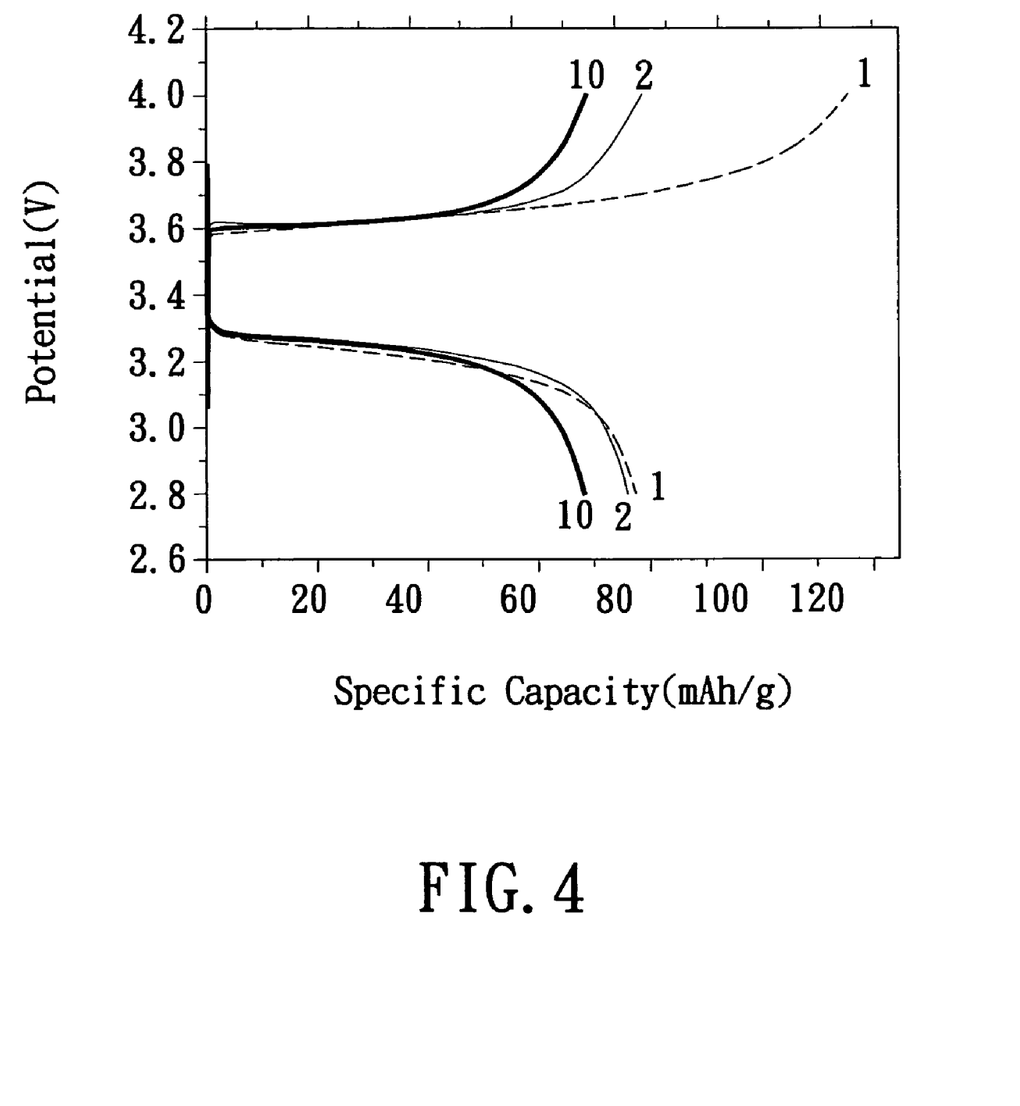
FIG. 4 shows a specific capacity versus voltage plot for a rechargeable battery with a cathode made from a cathode material obtained from comparative Example B.

FIGS. 3 and 4 show specific capacity versus voltage plots for cathodes made from the cathode material ($LiFePO_4/ZnAlO_x/C$) in the rechargeable battery of Example B of this invention and the lithium ferrous phosphate powders in the rechargeable battery of comparative Example B, respectively. The applied charge/discharge voltage ranges from 2.8 V to 4.0 V; the charge/discharge rate is set to C/5; and the temperature is maintained at room temperature.

From the results shown in FIG. 3, the specific capacity of the initial discharge curve (lower curve 1) of the cathode in the rechargeable battery of Example B can reach to 105 mAh/g. After ten charge/discharge cycles, the specific capacity of the discharge curve (lower curve 10) of the cathode in the rechargeable battery of Example B can reach to 101 mAh/g. However, from the results shown in FIG. 4, the specific capacity of the initial discharge curve (lower curve 1) of the cathode in the rechargeable battery of comparative Example B can reach to 78 mAh/g. After ten charge/discharge cycles, the specific capacity of the discharge curve (lower curve 10) of the cathode in the rechargeable battery of comparative Example B can reach to 68 mAh/g. Apparently, inclusion of metal oxide in the cathode material according to this invention will greatly improve the specific capacity of the rechargeable battery.

Note that the composite compound of the cathode material of Example B was not heated under a nitrogen environment in the presence of a carbonaceous material. There are residual ferric ions present in the cathode material since heat treatment under nitrogen environment cannot completely reduce ferric ions to ferrous ions. The presence of residual ferric ions reduces the specific capacity of the rechargeable battery. If the cathode material of Example B is heated under a nitrogen environment in the presence of a carbonaceous material, the specific capacity of the rechargeable battery will be further improved.

Figure 5:
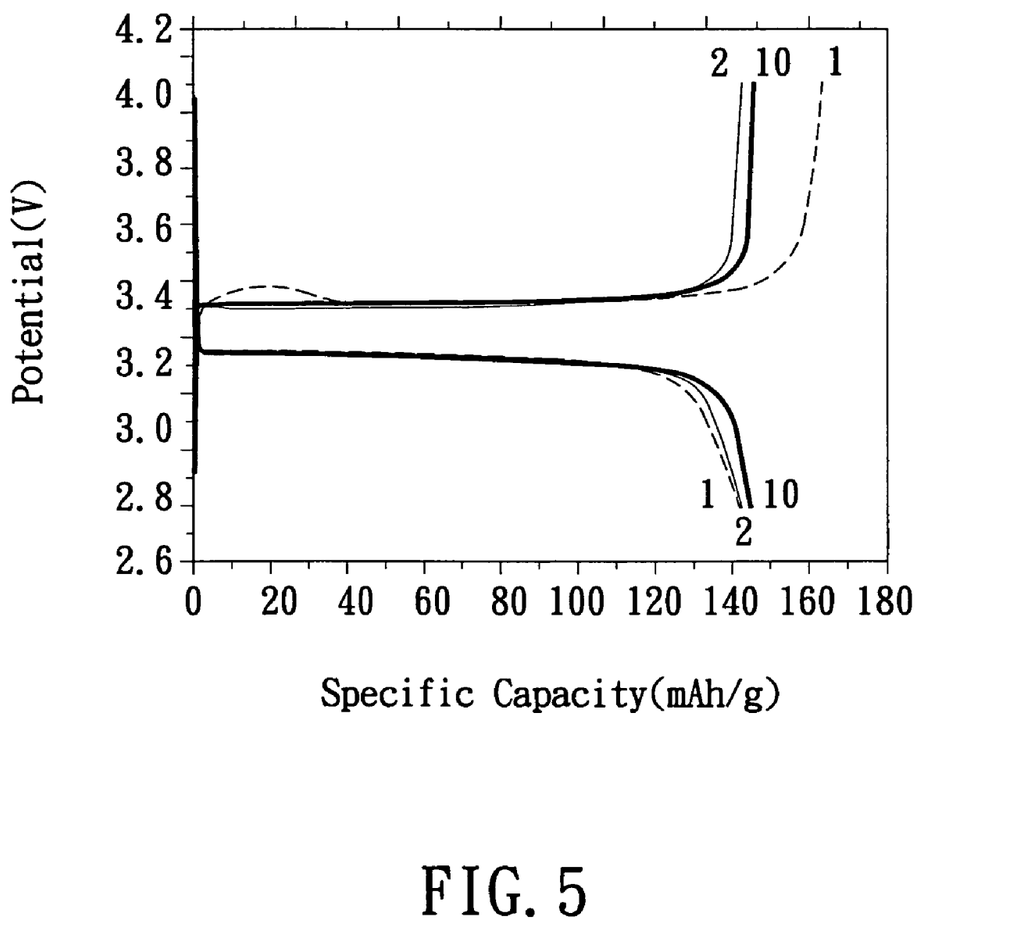
FIG. 5 shows a specific capacity versus voltage plot for a rechargeable battery with a cathode made from a cathode material obtained from Example C of this invention.

FIG. 5 shows a specific capacity versus voltage plot for a cathode made from the cathode material ($LiFePO_4/CuO/C$) in the rechargeable battery of Example C of this invention. The applied charge/discharge voltage ranges from 2.8 V to 4.2 V; the charge/discharge rate is set to C/5; and the temperature is maintained at room temperature.

From the results shown in FIG. 5, the specific capacity of the initial discharge curve (lower curve 1) of the cathode in the rechargeable battery of Example C can reach to 142 mAh/g. After ten charge/discharge cycles, the specific capacity of the discharge curve (lower curve 10) of the cathode in the rechargeable battery of Example C can reach to 145 mAh/g. Therefore, inclusion of metal oxide and the carbonaceous material in the cathode material will greatly improve the specific capacity of the rechargeable battery.

Compared with the conventional methods depicted in the background part, the cathode material according to this invention can be manufactured by a more economical and environmental friendly method, operating conditions of which are easily controlled, and no pollutant discharge is produced.

Furthermore, the cathode material according to this invention can be used to form a cathode, which can be further combined with an anode and an electrolyte to constitute a rechargeable battery. By way of the combined metal oxide dispersed in particles of the composite compound, conductivity of the cathode material and diffusion rate of metal ions of the composite compound, such as lithium ion, in the cathode material can be improved. In addition, the cathode made from such cathode material has good electrochemical reversibility, structural stability and themostability and thus, is suitable for use in a rechargeable battery of large current output and in multiple series-parallel rechargeable battery units.

While the present invention has been described in connection with what is considered the most practical and preferred embodiments, it is understood that this invention is not liM1ted to the disclosed embodiments but is intended to cover various arrangements included within the spirit and scope of the broadest interpretation and equivalent arrangements.

What is claimed is:

1. A cathode material composition, comprising:

an aggregation of particles of a composite compound having a formula of $A_{3x}M1_{2y}(PO_4)_3$; and fine particles of a conductive metal oxide dispersed in said aggregation of the particles of the composite compound, the metal oxide having a formula of $M2_aO_b$, wherein A represents a metal element selected from the group consisting of elements of Groups IA, IIA and IIIA; each of M1 and M2 independently represents a metal element selected from the group consisting of elements of Groups IIA and IIIA, and transition elements; and $0 \leq x \leq 1.2$, $1.2 \leq y \leq 1.8$, $0 < a \leq 7$, and $0 < b \leq 12$.

2. The cathode material composition of claim 1, wherein A is selected from the group consisting of Li, Na, K, Be, Mg, B, and Al, and each of M1 and M2 is independently selected from the group consisting of Sc, Ti, V, Cr, Mn, Fe, Co, Ni, Cu, Zn, Y, Zr, Nb, Mo, Be, Mg, Ca, Sr, B, Al, Ga, In, Si, Ge, and Sn.

3. The cathode material composition of claim 1, wherein the conductive metal oxide is present in an amount ranging from 0.1 to 5% by weight based on total weight of the cathode material composition.

4. The cathode material composition of claim 1, further comprising a carbonaceous material.

5. The cathode material composition of claim 4, wherein said carbonaceous material is present in an amount ranging from 0.1 to 5% by weight based on total weight of the cathode material composition.

6. The cathode material composition of claim 1, wherein the composite compound is lithium ferrous phosphate.

7. The cathode material composition of claim 1, wherein the conductive metal oxide is selected from the group consisting of $ZnAlO_z$, CuO, and ZnO, in which the subscript z represents the number of oxygen atoms for balancing with valences of zinc and aluminum atoms.

8. A rechargeable battery, including an anode, an electrolyte, and a cathode made from a cathode material, said cathode material comprising:

an aggregation of particles of a composite compound having a formula of $A_{3x}M1_{2y}(PO_4)_3$; and fine particles of a conductive metal oxide dispersed in said aggregation of the particles of the composite compound, the metal oxide having a formula of $M2_aO_b$;

wherein A represents a metal element selected from the group consisting of elements of Groups IA, IIA and IIIA; each of M1 and M2 independently represents a metal element selected from the group consisting of elements of Groups IIA and IIIA, and transition elements; and $0 \leq x \leq 1.2$, $1.2 \leq y \leq 1.8$, $0 < a \leq 7$, and $0 < b \leq 12$.

9. The rechargeable battery of claim 8, wherein A is selected from the group consisting of Li, Na, K, Be, Mg, B, and Al, and each of M1 and M2 is independently selected from the group consisting of Sc, Ti, V, Cr, Mn, Fe, Co, Ni, Cu, Zn, Y, Zr, Nb, Mo, Be, Mg, Ca, Sr, B, Al, Ga, In, Si, Ge, and Sn.

10. The rechargeable battery of claim 8, wherein the conductive metal oxide is present in an amount ranging from 0.1 to 5% by weight based on total weight of the cathode material.

11. The rechargeable battery of claim 8, wherein said cathode material further comprises a carbonaceous material dispersed in said aggregation of the particles of the composite compound.

12. The rechargeable battery of claim 11, wherein said carbonaceous material is present in an amount ranging from 0.1 to 5% by weight based on total weight of the cathode material.

13. The rechargeable battery of claim 8, wherein the composite compound has one of an olivine and NASICON structure.

14. The rechargeable battery of claim 8, wherein the composite compound is lithium ferrous phosphate.

15. The rechargeable battery of claim 9, wherein the conductive metal oxide is selected from the group consisting of $ZnAlO_z$, CuO, and ZnO, in which the subscript z represents numbers of oxygen atoms for balancing with valences of zinc and aluminum atoms.

* * * * *